United States Patent
Wang et al.

(10) Patent No.: US 9,495,291 B2
(45) Date of Patent: Nov. 15, 2016

(54) CONFIGURABLE SPREADING FUNCTION FOR MEMORY INTERLEAVING

(71) Applicant: QUALCOMM Incorporated, San Diego, CA (US)

(72) Inventors: Feng Wang, San Diego, CA (US); Bohuslav Rychlik, San Diego, CA (US); Anwar Q. Rohillah, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 303 days.

(21) Appl. No.: 14/251,626

(22) Filed: Apr. 13, 2014

(65) Prior Publication Data

US 2015/0095595 A1 Apr. 2, 2015

Related U.S. Application Data

(60) Provisional application No. 61/883,833, filed on Sep. 27, 2013.

(51) Int. Cl.
*G06F 12/06* (2006.01)

(52) U.S. Cl.
CPC ... *G06F 12/0607* (2013.01); *G06F 2212/1016* (2013.01)

(58) Field of Classification Search
None
See application file for complete search history.

(56) References Cited

U.S. PATENT DOCUMENTS

| | | | |
|---|---|---|---|
| 5,479,624 A * | 12/1995 | Lee | G06F 12/0607 711/1 |
| 7,418,571 B2 | 8/2008 | Wolrich et al. | |
| 7,610,457 B2 * | 10/2009 | Lee | H03M 13/276 711/157 |
| 8,190,809 B2 * | 5/2012 | Hutson | G06F 12/0607 711/157 |
| 8,438,320 B2 | 5/2013 | Srinivasan et al. | |
| 8,751,769 B2 * | 6/2014 | Mansour | H03M 13/27 711/157 |
| 2005/0172091 A1 | 8/2005 | Rotithor et al. | |
| 2008/0189493 A1 * | 8/2008 | Nakada | G06F 12/0607 711/157 |
| 2008/0250212 A1 | 10/2008 | Asaro et al. | |
| 2011/0047346 A1 * | 2/2011 | Cypher | G06F 12/0607 711/202 |
| 2011/0161782 A1 * | 6/2011 | Engin | G11C 7/1042 714/763 |
| 2011/0254590 A1 * | 10/2011 | Venkatramani | G06F 12/0607 326/52 |
| 2012/0054455 A1 | 3/2012 | Wang et al. | |
| 2012/0137090 A1 * | 5/2012 | Biswas | G06F 12/1018 711/157 |

OTHER PUBLICATIONS

International Search Report and Written Opinion—PCT/US2014/055449—ISA/EPO—Dec. 9, 2014.

* cited by examiner

*Primary Examiner* — Ryan Bertram
*Assistant Examiner* — Tracy Chan
(74) *Attorney, Agent, or Firm* — Muncy, Geissler, Olds & Lowe, P.C.

(57) ABSTRACT

A method of interleaving a memory by mapping address bits of the memory to a number N of memory channels iteratively in successive rounds, wherein in each round except the last round: selecting a unique subset of address bits, determining a maximum number (L) of unique combinations possible based on the selected subset of address bits, mapping combinations to the N memory channels a maximum number of times (F) possible where each of the N memory channels gets mapped to an equal number of combinations, and if and when a number of combinations remain (K, which is less than N) that cannot be mapped, one to each of the N memory channels, entering a next round. In the last round, mapping remaining most significant address bits, not used in the subsets in prior rounds, to each of the N memory channels.

23 Claims, 16 Drawing Sheets

| ch0 | ch1 | ch2 | ch3 | ch4 | ch5 | ch6 | ch7 | ch8 | ch9 | ch10 | ch11 | ch12 |
|---|---|---|---|---|---|---|---|---|---|---|---|---|
| 0 | 0 | 0 | 0 | 0 | 0 | 0 | 0 | 1 | 1 | 1 | 1 | 1 |
| 0 | 0 | 0 | 0 | 0 | 0 | 0 | 1 | 0 | 0 | 0 | 0 | 1 |
| 0 | 0 | 1 | 1 | 0 | 0 | 1 | 1 | 0 | 1 | 1 | 1 | 0 |
| 0 | 1 | 0 | 1 | 0 | 1 | 0 | 1 | 0 | 1 | 0 | 1 | 0 |
| ... | ... | ... | ... | ... | ... | ... | ... | ... | ... | ... | ... | ... |
| 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 |
| ... | ... | ... | ... | ... | ... | ... | ... | ... | ... | ... | ... | ... |
| ... | ... | ... | ... | ... | ... | ... | ... | ... | ... | ... | ... | ... |
| X | X | X | X | X | X | X | X | X | X | X | X | X |
| X | X | X | X | X | X | X | X | X | X | X | X | X |

From FIG. 5A

*FIG. 5C*

| ch0 | ch1 | ch2 | ch3 | ch4 | ch5 | ch6 | ch7 | ch8 | ch9 | ch10 | ch11 | ch12 |
|---|---|---|---|---|---|---|---|---|---|---|---|---|
| 0 | 0 | 0 | 0 | 0 | 0 | 0 | 0 | 1 | 1 | 1 | 1 | 1 |
| 0 | 0 | 0 | 0 | 1 | 1 | 1 | 1 | 0 | 0 | 0 | 0 | 1 |
| 0 | 0 | 1 | 1 | 0 | 0 | 1 | 1 | 0 | 0 | 1 | 1 | 0 |
| 0 | 1 | 0 | 1 | 0 | 1 | 0 | 1 | 0 | 1 | 0 | 1 | 0 |
| ... | ... | ... | ... | ... | ... | ... | ... | ... | ... | ... | ... | ... |
| ... | ... | ... | ... | ... | ... | ... | ... | ... | ... | ... | ... | ... |
| 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 |
| 0 | 0 | 0 | 0 | 0 | 0 | 0 | 0 | 0 | 0 | 0 | 0 | 0 |
| 1 | 1 | 1 | 1 | 1 | 1 | 1 | 1 | 1 | 1 | 1 | 1 | 1 |
| ... | ... | ... | ... | ... | ... | ... | ... | ... | ... | ... | ... | ... |
| ... | ... | ... | ... | ... | ... | ... | ... | ... | ... | ... | ... | ... |
| X | X | X | X | X | X | X | X | X | X | X | X | X |
| X | X | X | X | X | X | X | X | X | X | X | X | X |

From FIG. 5A

G = final

*FIG. 5D*

N x R interleaving

CONFIGURABLE SPREADING FUNCTION FOR MEMORY INTERLEAVING

CLAIM OF PRIORITY UNDER 35 U.S.C. §119

The present application for patent claims priority to Provisional Application No. 61/883,833 entitled "CONFIGURABLE SPREADING FUNCTION FOR MEMORY INTERLEAVING," filed Sep. 27, 2013, and assigned to the assignee hereof and hereby expressly incorporated by reference herein.

FIELD OF DISCLOSURE

Disclosed embodiments are directed to memory interleaving across two or more memory channels. More particularly, exemplary embodiments are directed to scalable and configurable spreading functions for uniform memory interleaving across any number of memory channels.

BACKGROUND

Memory interleaving is known in computer processing systems and applications, for distributing memory space into two or more memory banks. Such interleaving allows simultaneous and/or contiguous access of the two or more memory banks, thus avoiding read/write wait time delays that may be incurred if all memory addresses were mapped to a unified non-interleaved memory structure. Accordingly, memory interleaving can offer significant benefits in terms of memory access bandwidth and memory access speed.

With reference to FIG. 1, a simple two-way memory interleaving scheme into two memory banks is illustrated. A 32-bit address 102 (A[31:0]) may be used to address a memory (not illustrated), wherein odd addresses, for example, are directed to a first memory bank (not illustrated) through a first memory channel, channel Ch0 108_0, and all even addresses directed to a second memory bank (not illustrated) through a second memory channel, channel Ch1 108_1. In order to accomplish this, a simple channel spreading function, 104 is illustrated, where the least significant bit of address 102 (i.e., bit A[0]) can be used to decide which channel to route a particular address to. For example, if an even numbered value appears on address 102, bit A[0] would be "0," which can be used to direct the related memory access to first memory channel Ch0 108_0 (e.g., based on the simple channel spreading function 104 comprising selection signal CS0, for enabling access to first memory channel Ch0 108_0, being set to the value ~A[0]). Similarly, an odd numbered value of address 102, based on bit A[0] being "1" can be used to the related memory access to second memory channel Ch1 108_1 (e.g., where channel spreading function 104 further includes selection signal CS1 to be based on A[0] for selecting second memory channel Ch1 108_1). The remaining higher order bits of address 102 are used for intra-channel addressing function 106, i.e., addressing the memory space contained within each of the first and second memory banks pertaining to first and memory channels Ch0 108_0 and Ch1 108_1.

While the above simple scheme works well for two-way interleaving (or in general, interleaving for a number of memory channels equal to a power of 2), such schemes are not easily or efficiently scalable. For example, if a three-way interleaving is desired between three memory channels in a particular memory architecture, conventional memory interleaving techniques cannot accomplish a uniform interleaving across the three memory channels using a simple technique as that illustrated in FIG. 1 for two-way interleaving. This is because a similar channel spreading function for three-way interleaving may require the two lowest order bits of address 102, for example, to select between the three memory channels. However, two bits produce four binary bit combinations (i.e., "00," "01," "10," and "11"), and simply remapping addresses pertaining to the additional bit combination to one of the three memory channels would lead to lack of uniformity in dividing the addresses between the three memory channels, which is undesirable.

In an attempt to overcome the above drawbacks, particularly related to three-way interleaving, a conventional approach involves the use of a wider data bus, which is wide enough to access all three memory channels at the same time. For example, a 192-bit wide data bus may cover read and write accesses for all three memory channels pertaining to a 32-bit memory space. However, such conventional approaches are wasteful and do not exploit the benefits of interleaving; they tend to be inefficient in terms of power and area. Moreover, such approaches are closely tailored for a three-way interleaving and thus, are not scalable to interleaving across other numbers of memory channels.

Yet another conventional approach for three-way interleaving utilizes a mod-3 (modulus of 3) channel spreading function along with a table look up to select between the three channels for directing addresses. However, this approach involves an inelegant use of the modulus function, which are not efficiently mapped using the mod-3 spreading function. Implementing a mod-3 function requires hardware similar to that for implementing a hardware divider, which as one skilled in the art would understand, is expensive. Accordingly, this approach is also not desirable.

Other such approaches known in the art are similarly inefficient and lack scalability, simplicity, and uniformity in spreading functions. Therefore, there is a need for spreading functions which are scalable (e.g., beyond just 3, to other number of channels, such as, 5, 7, 13, etc.); configurable in their degree of spreading (e.g., less aggressive/more aggressive); and simple, cheap, and fast with regard to their implementation.

SUMMARY

Exemplary embodiments are directed to systems and methods for low cost, highly configurable, easily scalable memory interleaving functions which can implement uniform interleaving across any number of memory channels.

For example, an exemplary embodiment is directed to a method of interleaving a memory, the method comprising: mapping address bits of the memory to a number N of memory channels iteratively in successive rounds, wherein in each round except the last round: selecting a unique subset of address bits, determining a maximum number (L) of unique combinations possible based on the selected subset of address bits, mapping combinations to the N memory channels a maximum number of times (F) possible where each of the N memory channels gets mapped to an equal number of combinations, and if and when a number of combinations remain (K, which is less than N) that cannot be mapped, one to each of the N memory channels, entering a next round. In the last round, mapping remaining most significant address bits, not used in the subsets in prior rounds, to each of the N memory channels. In the above exemplary method, N, L, K, and F satisfy the equation, $N=(L-K)/F$.

Another exemplary embodiment is directed to A method of memory interleaving, the method comprising: mapping, by a memory controller, address bits of a memory to a number N of memory channels, iteratively in a predetermined number (G_total) of successive rounds, wherein each round, except the last round comprises: selecting a subset of address bits comprising a predefined number (n) of lowest order address bits that have not been used for interleaving across the N memory channels; determining a maximum number (L) of unique binary values that can be represented by the selected subset of (n) address bits; mapping an equal number of binary values within the maximum number to each of the N memory channels; and if and when a number of binary values remain (K<N) that cannot be mapped an equal number of times to each of the N memory channels, entering a next round. The last round, comprises mapping, by the memory controller, binary values represented by a last number (min_bits) of most significant address bits to the N memory channels. Once again, N, L, K, and F satisfy the equation, N=(L−K)/F.

Another exemplary embodiment is directed to a processing system comprising: a memory comprising a number N of memory channels. The processing system comprises means for mapping address bits of the memory to the N memory channels, iteratively in a predetermined number (G_total) of successive rounds, comprising, for each round, except the last round: means for selecting a subset of address bits comprising a predefined number (n) of lowest order address bits that have not been used for interleaving across the N memory channels; means for determining a maximum number (L) of unique binary values that can be represented by the selected subset of (n) address bits; means for mapping an equal number of binary values within the maximum number to each of the N memory channels; and means for, if and when a number of binary values remain (K<N) that cannot be mapped an equal number of times to each of the N memory channels, entering a next round. The processing system further comprises means for, in the last round, mapping binary values represented by a last number (min_bits) of most significant address bits to the N memory channels. Once again, N, L, K, and F satisfy the equation, N=(L−K)/F.

Yet another exemplary embodiment is directed to processing system comprising: a processor and a memory communicatively coupled to the processor, the memory comprising a number N of memory channels. A memory controller is configured to map address bits of the memory to the N memory channels, iteratively in a predetermined number (G_total) of successive rounds, comprising, for each round, except the last round, the memory controller configured to select a subset of address bits comprising a predefined number (n) of lowest order address bits that have not been used for interleaving across the N memory channels; determine a maximum number (L) of unique binary values that can be represented by the selected subset of (n) address bits; map an equal number of binary values within the maximum number to each of the N memory channels; and if and when a number of binary values remain (K<N) that cannot be mapped an equal number of times to each of the N memory channels, enteri next round. The memory controller is further configured to, in the last round, map binary values represented by a last number (min_bits) of most significant address bits to the N memory channels. Once again, N, L, K, and F satisfy the equation, N=(L−K)/F.

Yet another exemplary embodiment is directed to a non-transitory computer-readable storage medium comprising code, which, when executed by a processor, causes the processor to perform operations for interleaving a memory coupled to the processor, the memory comprising N memory channels, the non-transitory computer-readable storage medium comprising: code for mapping address bits of the memory to the N memory channels, iteratively in a predetermined number (G_total) of successive rounds, comprising, for each round, except the last round: code for selecting a subset of address bits comprising a predefined number (n) of lowest order address bits that have not been used for interleaving across the N memory channels; code for determining a maximum number (L) of unique binary values that can be represented by the selected subset of (n) address bits; code for mapping an equal number of binary values within the maximum number to each of the N memory channels; and code for, if and when a number of binary values remain (K<N) that cannot be mapped an equal number of times to each of the N memory channels, entering a next round; and code for, in the last round, mapping binary values represented by a last number (min_bits) of most significant address bits to the N memory channels. Once again, N, L, K, and F satisfy the equation, N=(L−K)/F.

BRIEF DESCRIPTION OF THE DRAWINGS

The accompanying drawings are presented to aid in the description of embodiments of the invention and are provided solely for illustration of the embodiments and not limitation thereof.

FIG. 3 illustrates an exemplary spreading function for 3 channels.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Disclosed solutions address the aforementioned drawbacks. More specifically, exemplary embodiments include fully configurable and scalable memory interleaving techniques which are inexpensive and fast. Exemplary memory interleaving techniques also ensure highly uniform distribution across any number of two or more desired memory channels and eliminate wastage/under-utilization of available memory cells.

Figure 1:
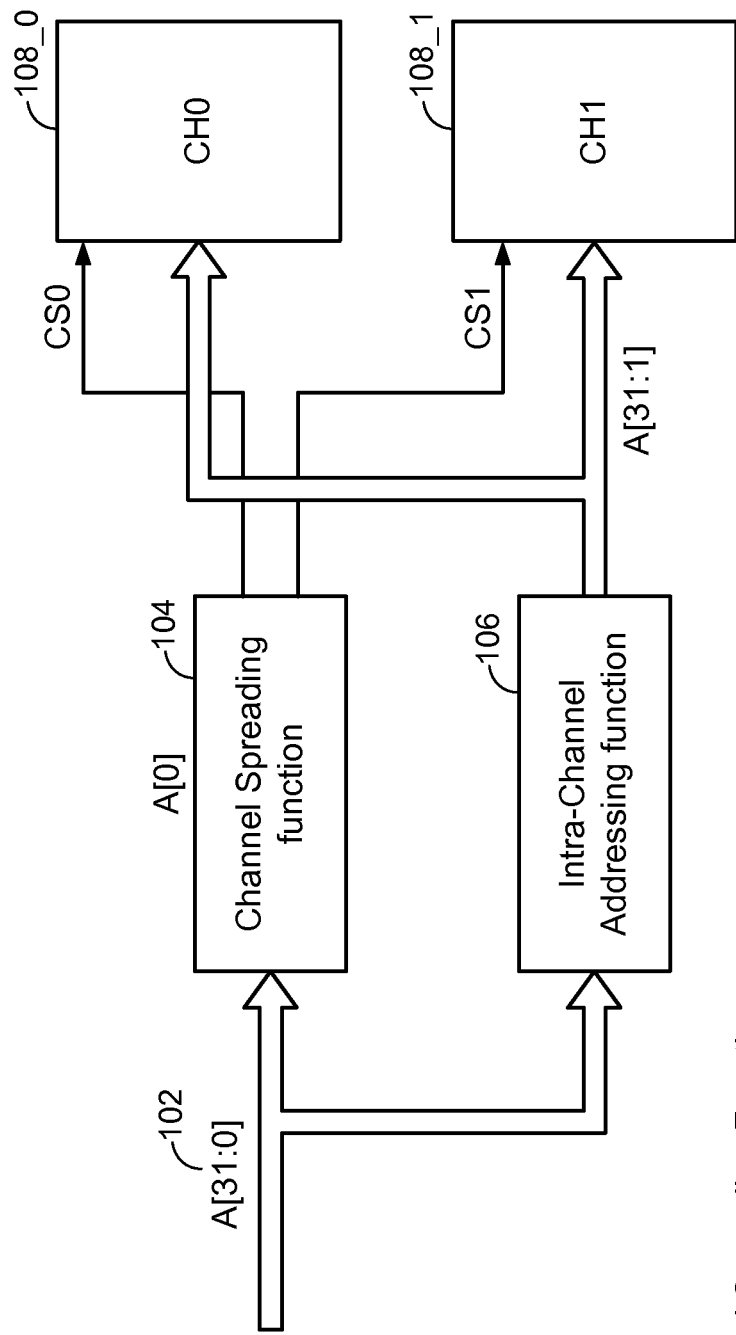
FIG. 1 illustrates memory interleaving with a description of conventional terminology.
Figure 2:
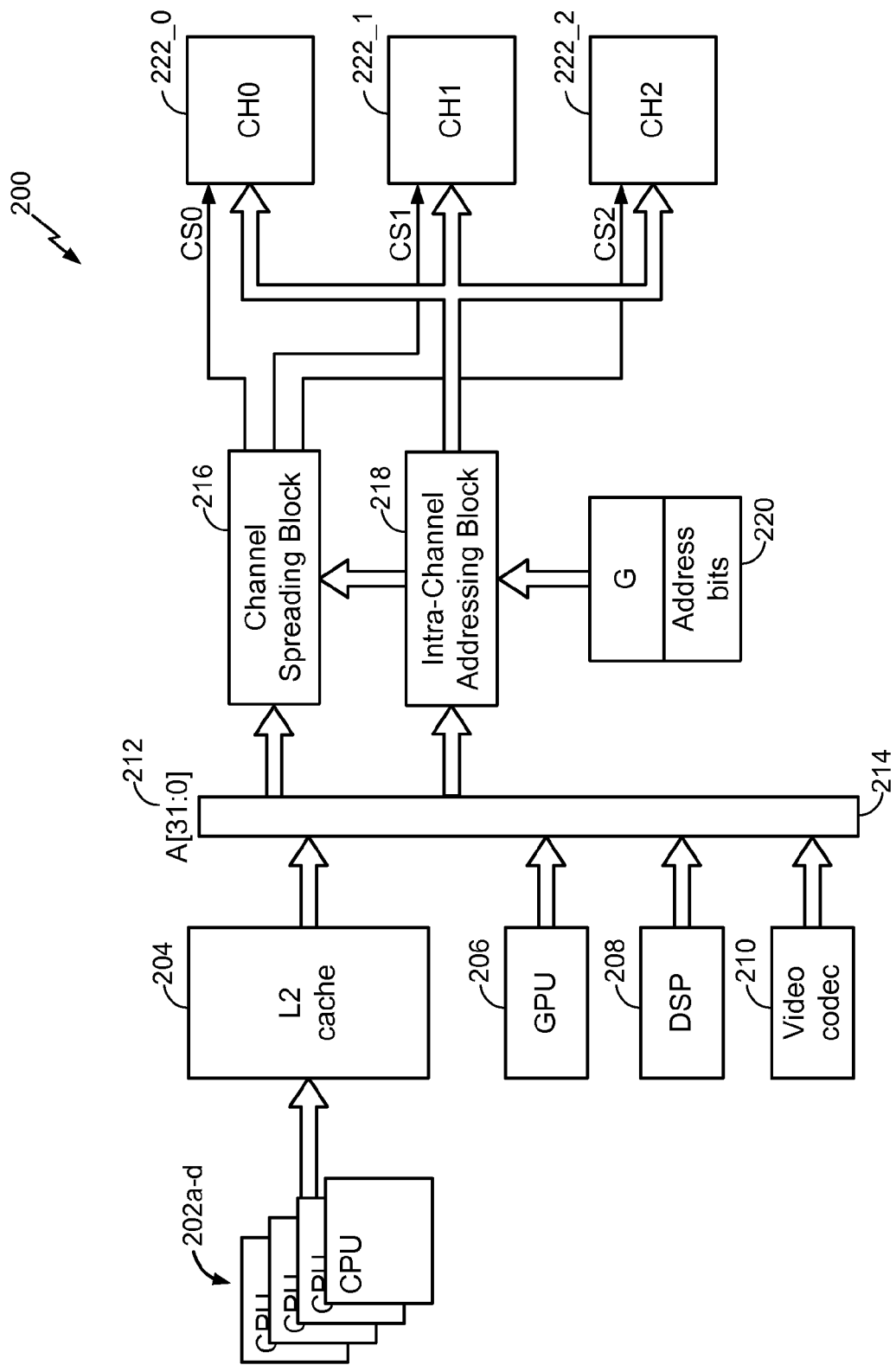
FIG. 2 illustrates exemplary interleaving techniques that utilizes a fully configurable spreading function.

With reference to FIG. 2, a schematic depiction of certain aspects of an exemplary processing system 200 is provided. As shown, processing system 200 can include one or more processors or central processing units (CPUs) 202a-d. A common L2 cache 204 is illustrated as accessible by CPUs 202a-d, where L2 cache is communicatively coupled to system bus 214. Additionally, graphics processing unit (GPU) 206, digital signal processor (DSP) 208, and a video coder/decoder (codec) 214 are also shown to be coupled to system bus 214. System bus 214 interfaces a 32-bit addressable memory interleaved across three memory channels, Ch0 222_0, Ch1 222_1, and Ch2 222_2, addressable by 32-bit address 212 (A [31:0]). Channel spreading block 216 can be part of a memory controller (not shown), for example, and can be configured to implement an exemplary channel spreading function which can provide select lines CS0-CS2 for selectively enabling one of three memory channels Ch0 222_0, Ch1 222_1, or Ch2 222_2 respectively, for the purposes of exemplary interleaved access of these three memory channels. Intra-channel addressing block 218 can be configured to provide intra-channel addresses for accessing memory cells or entries within each of the three memory channels Ch0 222_0, Ch1 222_1, and Ch2 222_2. In general, it will be understood that the embodiments are not limited to the above-described elements and arrangement illustrated in FIG. 2, and various alternative configurations of processing system 200 are possible without departing from the scope of this disclosure.

According to exemplary aspects a generation (G) block 220 is also provided in processing system 200, for implementing the channel spreading function and intra-channel addressing in one or more generations, represented by the variable "G". The total number of generations, represented by a programmable constant, "G_total," in which an exemplary channel spreading function can be implemented, can be programmed, for example, via a register (not shown). G_total may be configured or programmed into the register during system boot up of processing system 200, for example. Further, a number of address bits which may be utilized in the channel spreading function can also be programmed in G block 220, for example, via a register (not shown). Although illustrated as a separate block, the logic/functions pertaining to G block 220 can be infused or integrated within other logic blocks of processing system 200, such as, channel spreading block 216 and/or intra-channel addressing block 218. In some aspects, G block, channel spreading block 216, and intra-channel addressing block 218, may be part of a memory controller (not shown).

An exemplary channel spreading function across a number "N" of memory channels (or "N-way interleaving") will now be explained over a selectable total number G_total generations of applying the channel spreading function, using a baseline example of memory interleaving across the three memory channels Ch0 222_0, Ch1 222_1, and Ch2 222_2, of FIG. 2. The channel spreading function can be implemented in channel spreading block 216, with a value of G_total obtained from G block 220, for example. More specifically, in each of the generations/rounds, where G varies from 1 to G_total, one or more bits of 32-bit address 212 (A[31:0]) are selected for determining which one of the N (=3) memory channels will be mapped to a particular combination of the selected address bits.

Figure 3:
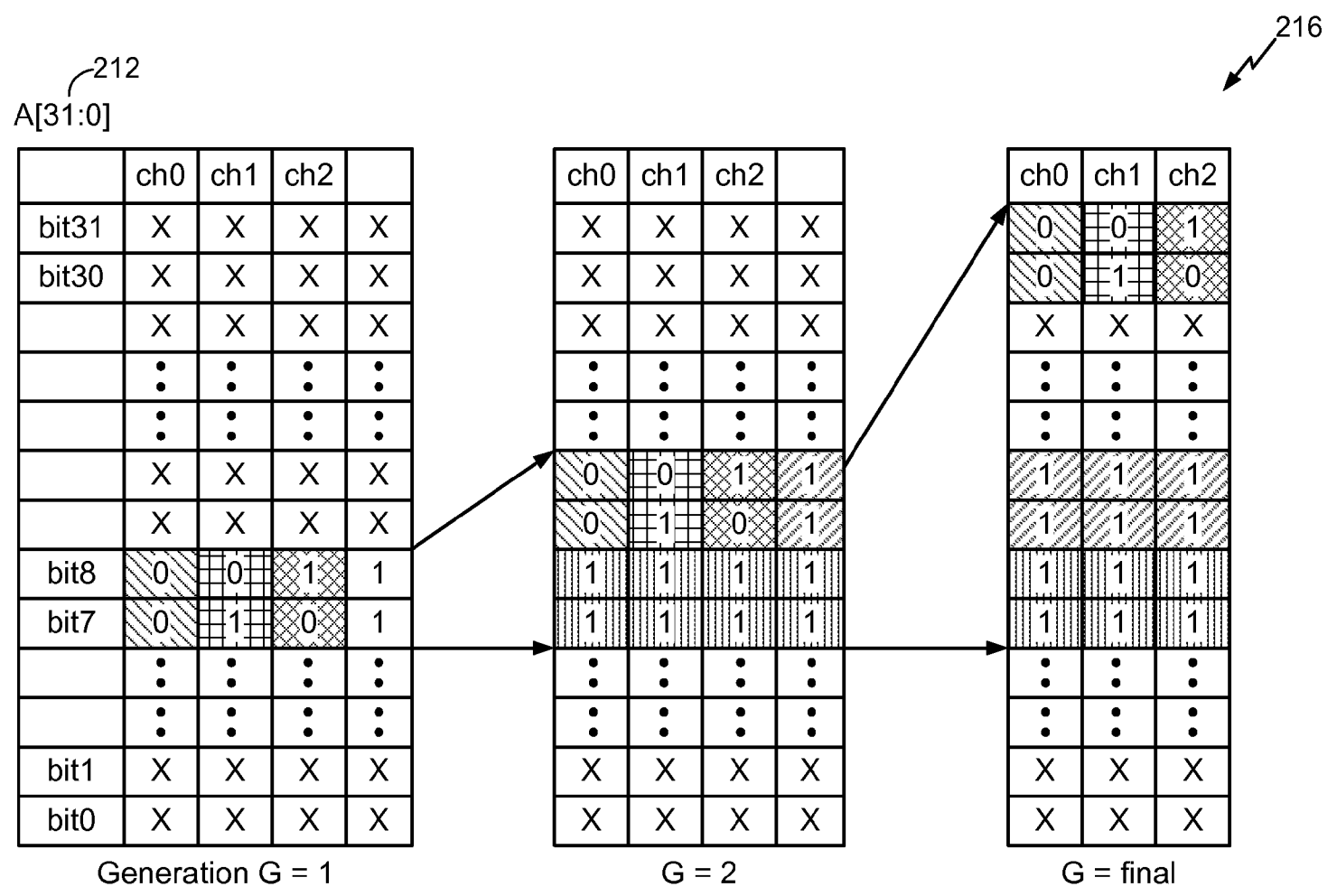

For example, with reference to FIG. 3, in a first generation, i.e. G=1, bits A[8:7] of address 212 can be selected, such that the binary value pertaining to bit combinations A[8:7]=00 can be mapped to Ch0 222_0; A[8:7]=01 can be mapped to Ch1 222_1; and A[8:7]=10 can be mapped to Ch2 222_2 (in this case, address bits A[6:0] may be used for intra-channel addressing of memory channels Ch0 222_0, Ch1 222_1, and Ch2 222_2, for example, by means of intra-channel addressing block 218). However, the binary value pertaining to bit combination A[8:7]=11 would be remaining, which cannot be mapped to one of the three memory channels Ch0 222_0, Ch1 222_1, and Ch2 222_2, without disturbing uniformity. Thus, exemplary techniques involve entering a second generation when such remaining binary values, pertaining to unmapped bit combinations for the selected bits, are reached. Accordingly, for the subsequent round or generation G=2, higher order bits A[10:9], which are adjacent to and more significant than address bits A[8:7] of the preceding round, are selected and the interleaving or mapping of address 212 to memory channels Ch0 222_0, Ch1 222_1, and Ch2 222_2 is based on binary values pertaining to bit combinations of A[10:9]. Once again, the binary value pertaining to bit combination A[10:9]=11 would be remaining, thus triggering the third generation, G=3 (not shown). This process is repeated iteratively until the final generation, pertaining to G=G_total, is reached.

In general, in the final generation, where G=G_total, the number of bits of address 212 can be obtained by determining the minimum number of address bits that will be required to represent the number of memory channels across which interleaving is performed. This minimum number of address bits (hereinafter, "min_bits") that will be required to represent the N number of memory channels can be determined by the mathematical expression, "min_bits=ceiling ($\log_2 N$)." A "ceiling" function is a well-known mathematical function which maps a real number to the largest following integer. For example, with regard to a real number "x," ceiling(x) is the smallest integer not less than "x." Thus, for the given example with N=3 memory channels, min_bits=ceiling($\log_2 3$)=2. Accordingly, the two highest order bits, i.e., bits A[31:30], are selected for mapping the channels in the final generation where G=G_total. It will be recognized that in this final generation, once, A[31:30]=00 is mapped to channel Ch0 222_0, A[31:30]=01 is mapped to channel Ch1 222_1, and A[31:30]=10 is mapped to channel Ch2 222_2, the remaining binary value pertaining to bit combination, A[31:30]=11 would not pertain to a valid address, or rather, would point to unpopulated memory. Thus, once this final generation of mapping or interleaving is completed, all valid address bit combinations would be exhausted, and a uniform interleaving across the three memory channels, Ch0 222_0, Ch1 222_1, and Ch2 222_2, would have been completed.

Advantageous aspects of the above-described exemplary interleaving technique can be understood by contrasting exemplary aspects with conventional techniques. For example, in a conventional 3-way hash function for three-way interleaving, two address bits may be similarly selected, for mapping addresses to three memory channels. Once again, binary values pertaining to three of the four possible bit combinations of the two selected address bits may be mapped to the three memory channels. However, in contrast to the above-described exemplary techniques, if the remaining binary values pertaining to bit combination of the selected two address bits, e.g., "11," are reassigned to one of the three memory channels, such as, a first memory channel, then it will be readily seen that statistically more accesses will be directed to the first memory channel, in comparison the two other channels. In addition to this disproportionate number of memory accesses directed to the first memory channel, a higher proportion of the overall physical memory space will also need to be assigned to this first memory channel. Such non-uniform assignment of physical memory space would lead to undesirable effects, as previously described. On the other hand, if the interleaving process is iteratively performed as per exemplary techniques, where the remaining binary values pertaining to bit combinations trigger selection of different address bits for mapping, the disproportionate accesses and non-uniform assignment of memory space of conventional techniques is avoided. For example, exemplary techniques can allow the use of equally-sized dynamic random access memory structures (DRAMs) without wasting memory space or populating the memory channels unevenly. Specifically, all three channels, Ch0 222_0, Ch1 222_1, and Ch2 222_2, can be populated with exactly the same number of DRAM cells. In other words, embodiments overcome problems associated with statistical access imbalance, as well as, address space imbalance (particularly for true physical memory, such as, main memory, but not caches, as population of caches may follow application specific access patterns which may not correspond to organization of physical memory address space).

The above-described exemplary spreading function for N=3 memory channels, will now be extended to an arbitrary number of memory channels. For proving the functional correctness of exemplary techniques, a process of inductive reasoning can be employed. In general, inductive reasoning or mathematical induction involves a method of proving a function or mathematical equation, wherein, a given statement or proposition is proven to be true for all natural numbers by proving that the given statement is true for a first natural number in a first step; based on proving the statement is true for the first natural number, proving that the given statement is true for a next or second natural number in a second step; and thereby inferring from the first and second steps that the given statement must be true, by the theory of mathematical induction, for all natural numbers.

More specifically with regard to exemplary embodiments, a first step can involve establishing uniform memory interleaving across a first number of memory channels according to exemplary embodiments. For this first step, the first number can be a power of 2 (e.g., N=2^M where M is a whole number). Memory interleaving in this case is straightforward (e.g., N=2 or 4, where it is easy to uniformly distribute addresses across two or four memory channels, for example, using n=1 or 2 selected address bits, respectively).

In a next or second step, the case of memory interleaving across N=2^M−1 memory channels is considered. This second step can correspond to the above-described memory interleaving across three memory channels (e.g., where M=2, N=2^2−1=3). The functional correctness of this second step has already been discussed in detail in the foregoing sections.

Accordingly, the exemplary techniques are seen to be established for the two natural numbers (i.e., N=2^M and N=2^M−1), which satisfies the required first and second steps of proof by mathematical inductions. Thus, exemplary techniques can now be proven to be established and effective for memory interleaving across all natural number of memory channels, based on the theory of mathematical induction.

A mathematical formulation of the above-described techniques will now be discussed, to extend the exemplary embodiments to any generic N number of memory channels. In order to accomplish this, the number N of memory channels across which memory interleaving is to be performed, is represented by a mathematical formula, N=(L−K)/F. As used herein, L, K, and F are natural numbers, where, in the first generation, or G=1, L-way spreading (i.e., across L memory channels) is applied F number of times, using a selected set of one or more address bits. After this first generation of applying the exemplary spreading function, binary values pertaining to bit combinations corresponding to K ways may be remaining. In the second generation with G=2, the above spreading process is repeated, i.e., L-way spreading is performed. Similarly, a number of generations involving L-way spreading are iteratively repeated until only a number of most significant bits (MSBs) of the address remain, corresponding to a last generation, G=G_total.

Figure 4A:
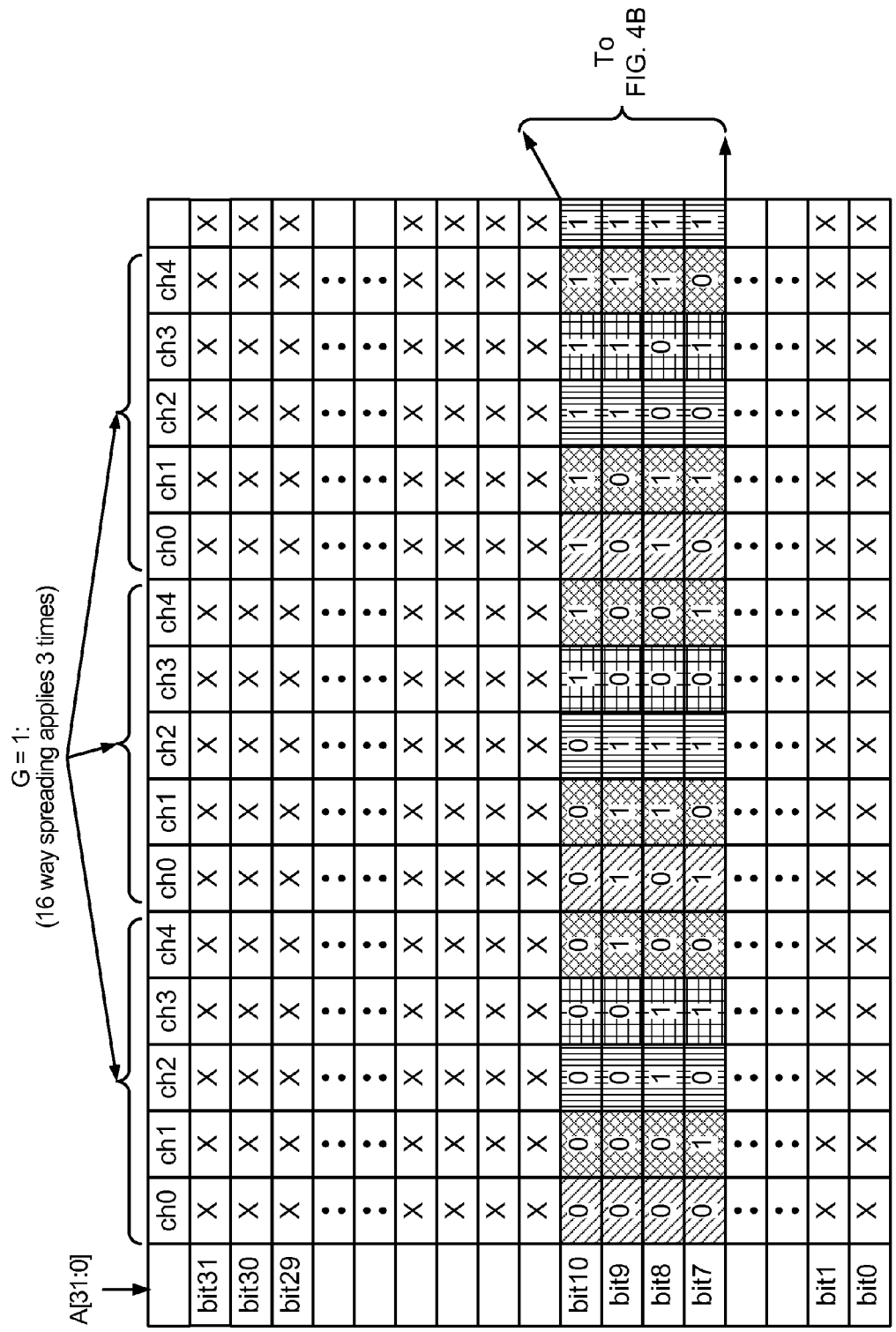
FIG. 4 is a diagram of FIGS. 4A-C illustrating an exemplary spreading function for N=5 channels where, where N is represented by (L−K)/F.
Figure 4B:
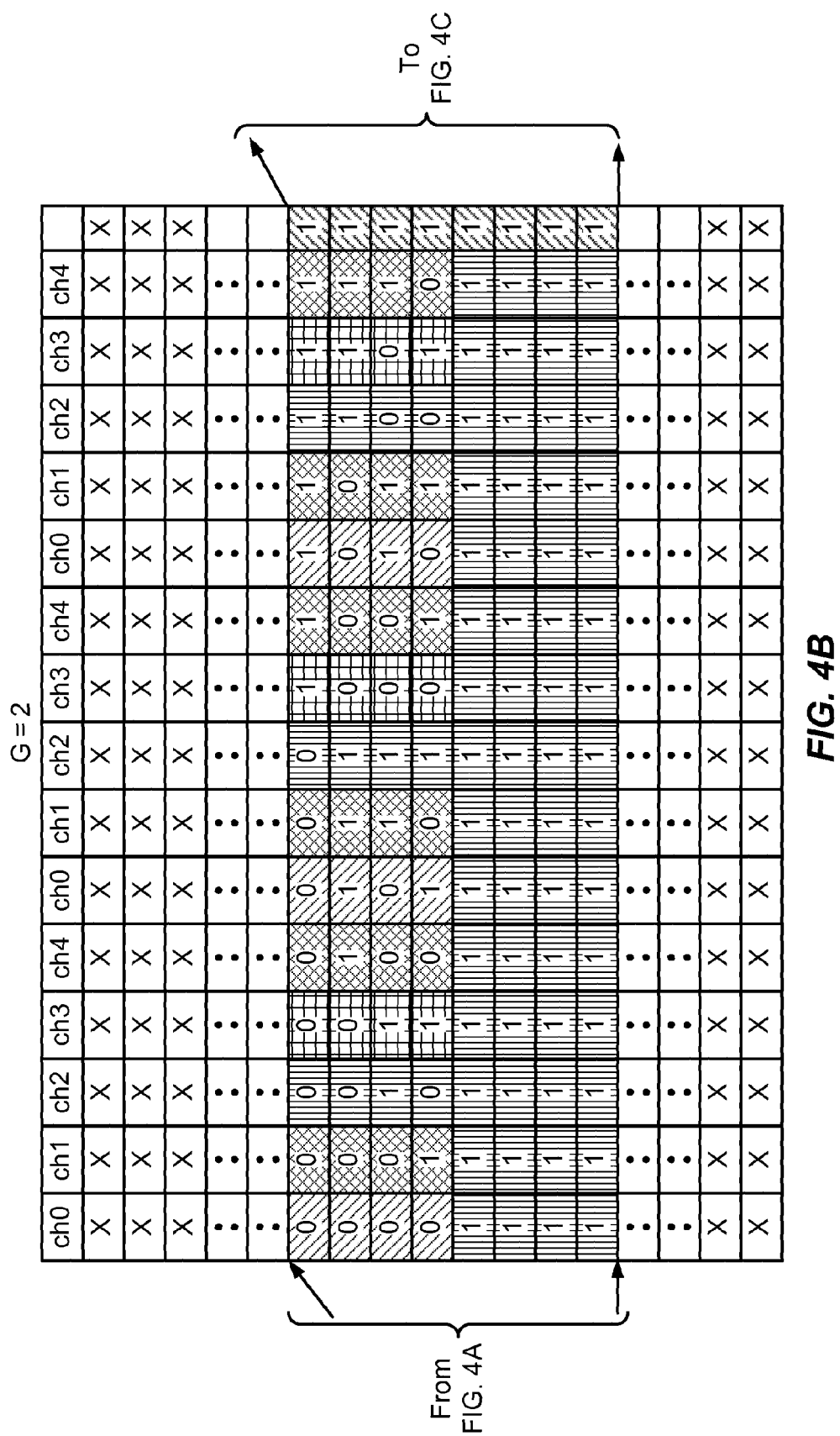

With reference now to FIG. 4 (comprising FIGS. 4A-C), a numerical example where N=5 memory channels (i.e., Ch0-4) is illustrated. In more detail, N is represented by the mathematical formula N=(L−K)/F, wherein, L=16, K=1, and F=3, such that N=(16−1)/3=5. Theoretically, L-ways or 16-ways can be obtained using four selected address bits, A[10:7]. In the first generation, G=1, binary values pertaining to address mappings of bits A[10:7] to five memory channels wraparound F=3 times. In other words, address bits A[10:7] produce 16 possible binary values pertaining to binary bit combinations, represented by the decimal range of values, 0-15. With reference to FIG. 4A, bit combinations corresponding to decimal values 0, 5, 10 can be mapped to a first of the five memory channels, Ch0; decimal values 1, 6, 11 to second memory channel Ch1; decimal values 2, 7, 12 to third memory channel Ch2; decimal value 3, 8, 13 to fourth memory channel Ch3; and decimal values 4, 9, 14, to fifth memory channel Ch4.

Once the binary bit combination corresponding to decimal value 15 (i.e., binary bit combination "1111") is reached, the above mapping process is repeated next higher order address bits, A[14:11], in the next generation, G=2, as illustrated in FIG. 4B. The above process is iteratively repeated in successive generations, until the last generation, with G=G_total. The number of highest order bits (min_bits) used in the last generation, for N=5, is given by ceiling($\log_2$ 5)=3.

Figure 4C:
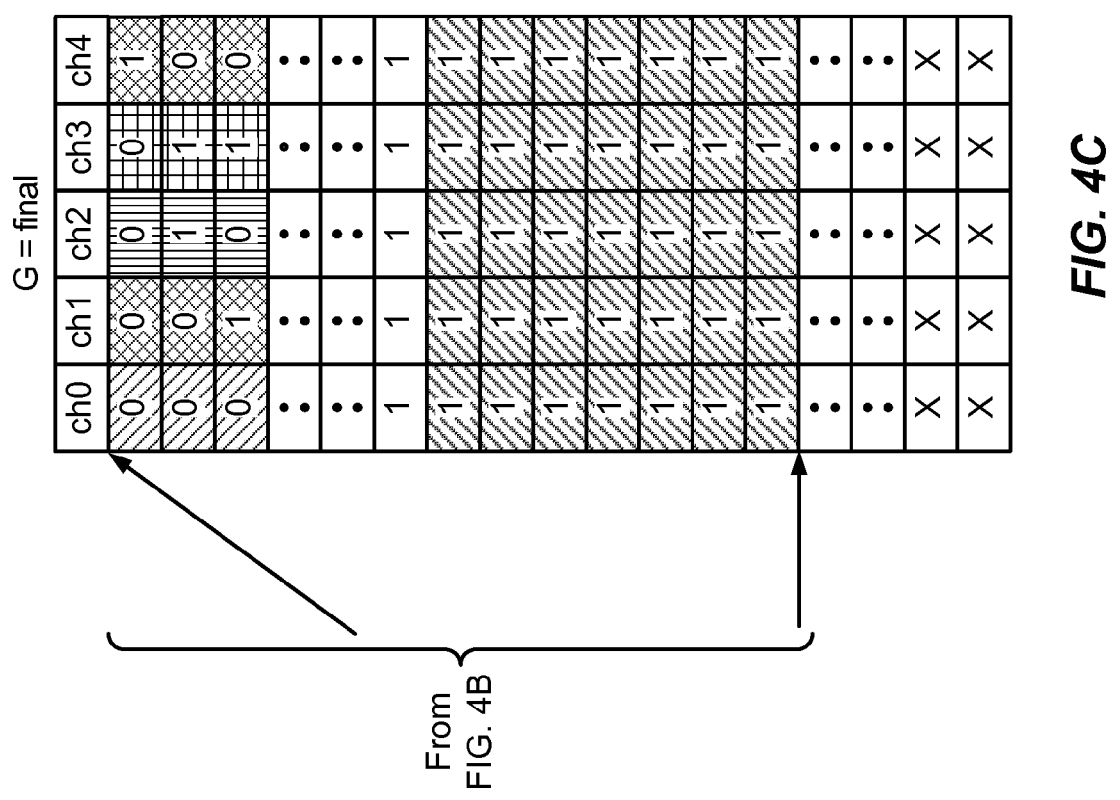

As illustrated in FIG. 4C, the 3 address bits A[31:29] are used in the last generation, G=G_total, for interleaving across the 5 memory channels. These 3 address bits can produce 8 possible binary bit combinations. However, only 5 of these possible 8 binary bit combinations are mapped to corresponding 5 memory channels; the remaining 3 binary bit combinations do not correspond to a valid mapping, and thus, no mapping of these final leftover combinations for address bits A[31:29] is performed. The mapping of a 32-bit address space to five memory channels is now complete. Accordingly, the exemplary embodiments can be extended to memory interleaving across any arbitrary number N of memory channels based on the above mathematical formulation of N and corresponding iterative mapping of selected address bits in successive generations.

With regard to intra-channel addressing in the above cases with (L−K)/F ways, in each round or generation, the lower order address bits are used for intra-channel addressing. More specifically, If F>=1, the selected address bits utilized for interleaving across the channels are replaced with a selected address bit+top MSB bits (upper round of log 2(L)) for intra-channel addressing bits, except for the last generation. In the last generation the same intra-channel addressing function as the one before last generation is used. If F=1, a simplified algorithm is used, where the address bits for interleaving across the memory channels are replaced with the top MSB bits, except for the last generation for intra-channel addressing. In the last generation, address bits except for the top MSB address bits are used for intra-channel addressing.

Figure 5:
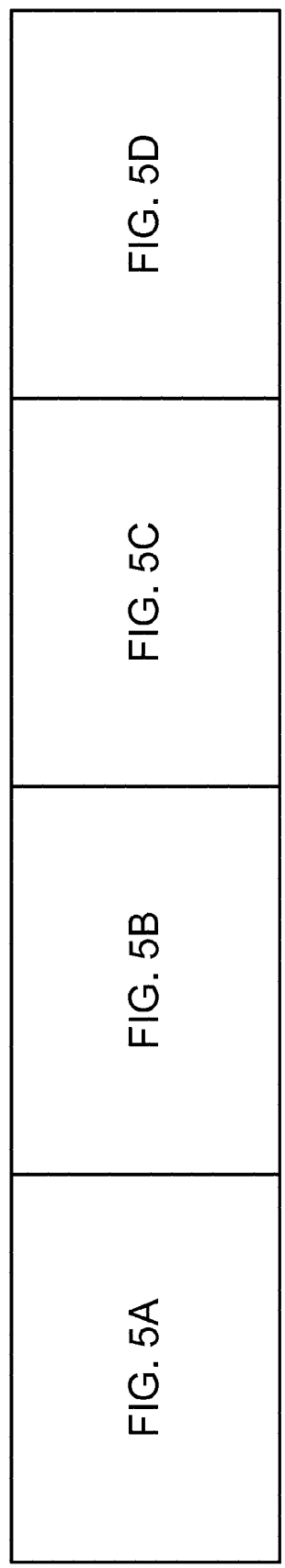
FIG. 5 is a diagram of FIGS. 5A-D illustrating an exemplary spreading function for N=13 channels where, where N is represented by (L−K)/F.
Figure 5A:
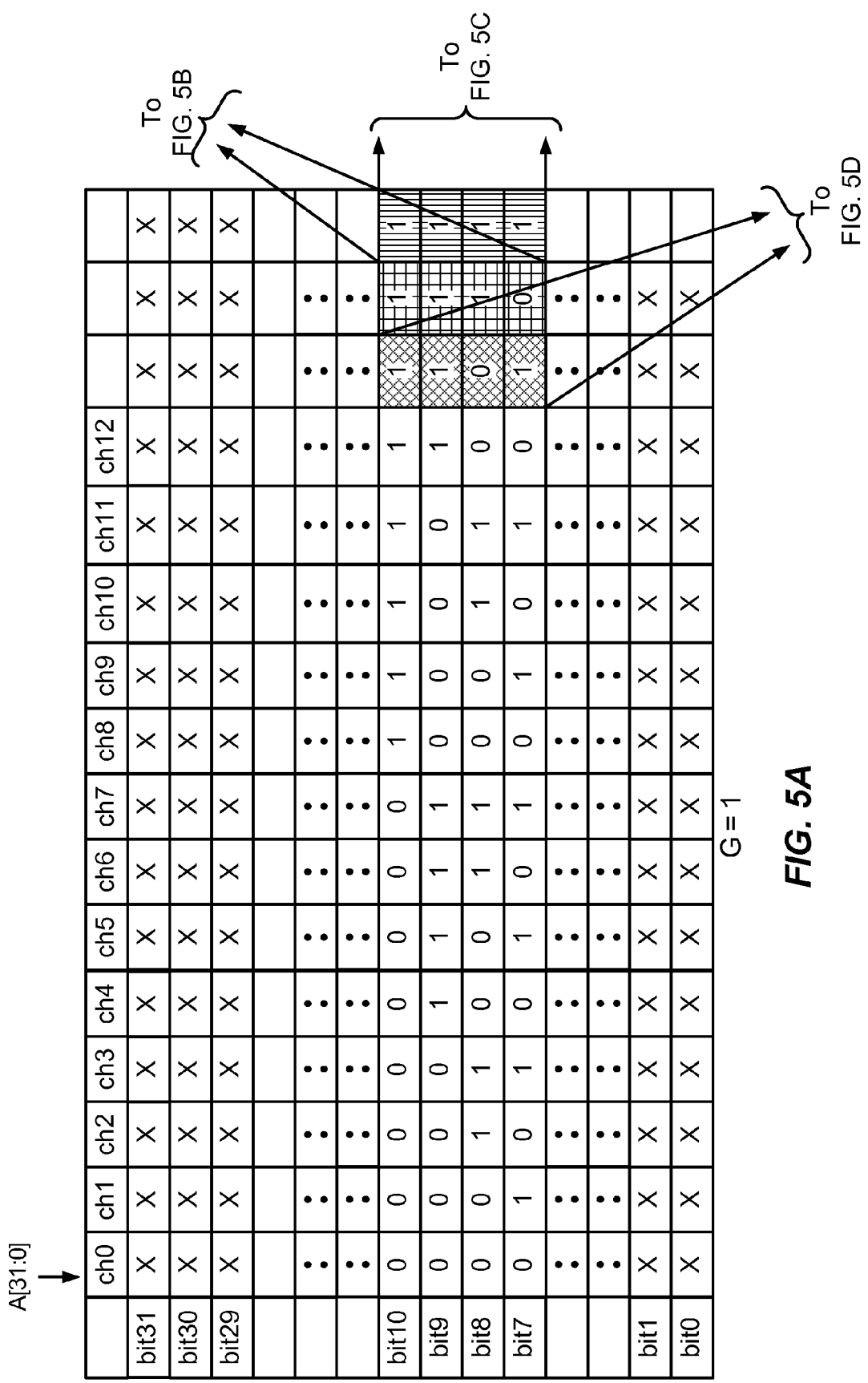
Figure 5B:
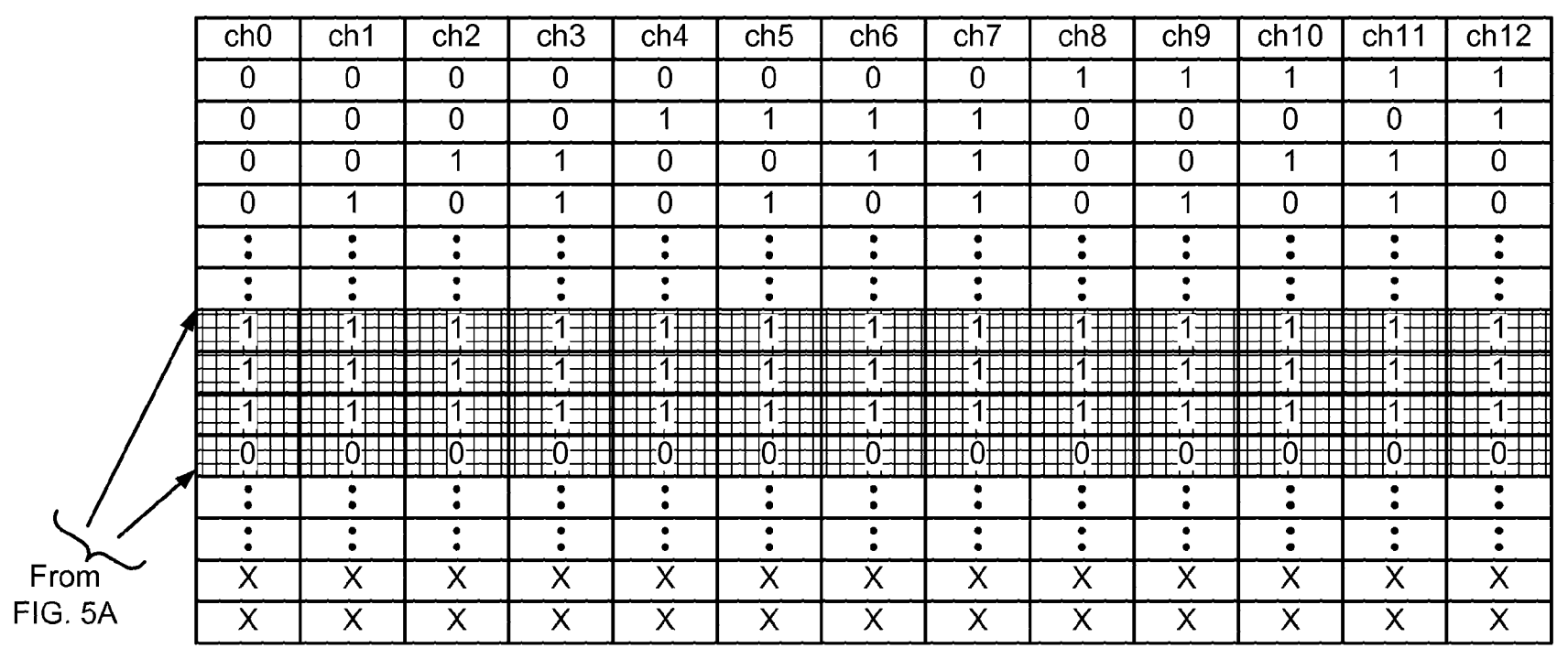

Referring to FIG. 5 (comprising FIGS. 5A-D), yet another example of exemplary interleaving is illustrated for N=13 memory channels, where N is expressed in terms of (L−K)/F, with values, L=16, K=3, and F=1. In this case, in the first generation, as illustrated in FIG. 5A, address bits A[10:7] are selected in a first generation, G=1, with 16 possible binary values pertaining to binary bit combinations. Of these, 13 binary values pertaining to bit combinations are mapped to the 13 memory channels Ch0-Ch12. A number, min_bits=ceiling($\log_2$ 13)=3, highest order address bits, i.e., the address bits A[31:29] are used in the last generation, G=G_total, as shown in FIGS. 5B-D.

In yet other embodiments, channel spreading functions may be combined. For example, if spreading functions are calculated or predetermined for N-way memory interleaving (i.e., across N memory channels) and similarly, for R-ways, a combined spreading function can be obtained for N*R-way memory interleaving by combining the N-way and the R-way spreading functions.

Figure 6:
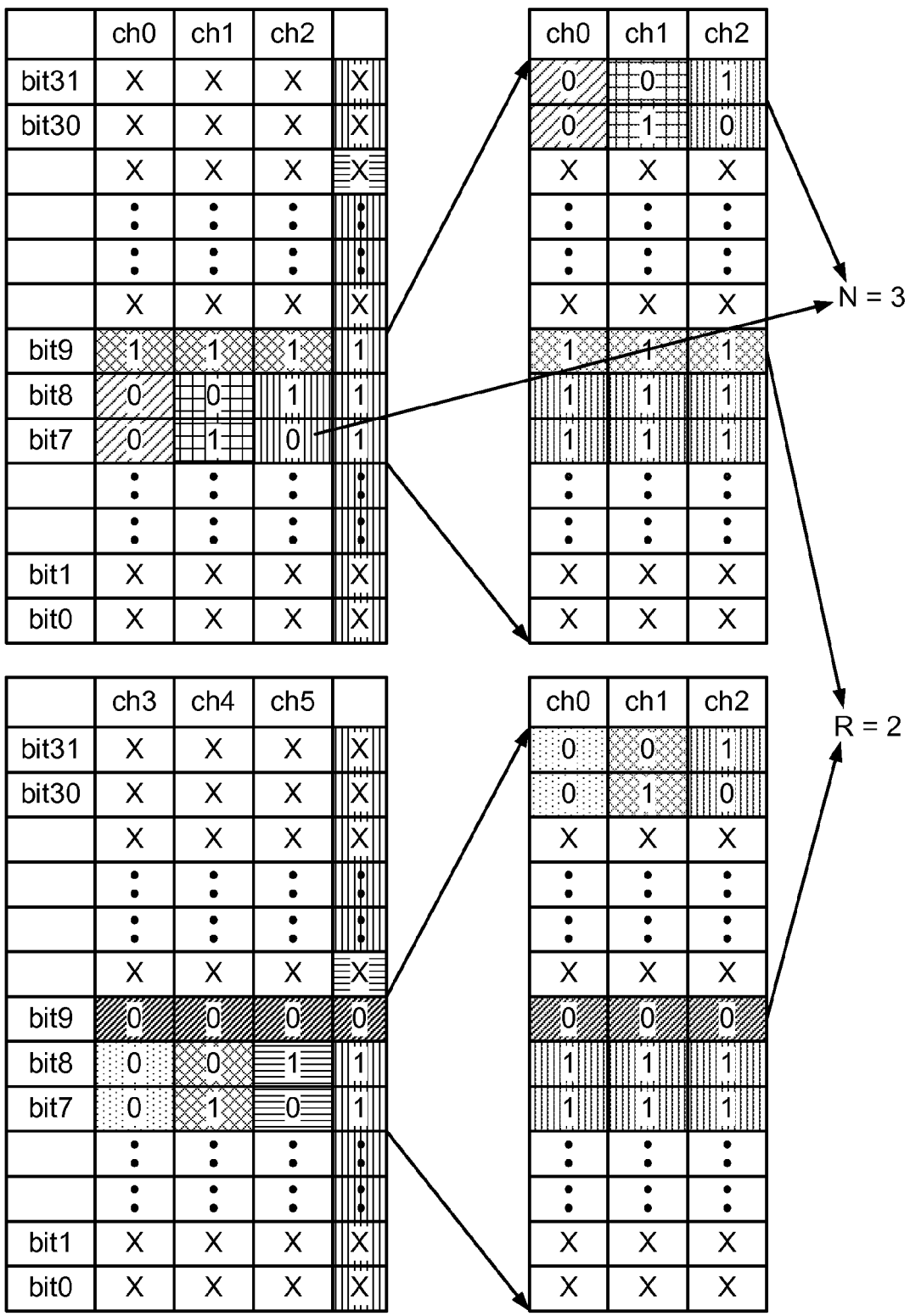
FIG. 6 illustrates exemplary N*R way spreading by combining the N way spreading and the R way spreading.

With reference to FIG. 6, an embodiment pertaining to a combined channel spreading function is illustrated. As illustrated, in generation G=1, exemplary memory interleaving for N=3, or interleaving across three memory channels, can be performed using address bits A[7:8] to A[31:30] as previously described. Additionally, two way interleaving or interleaving across a number R (=2) memory channels can be performed using address bit A[9]. The above interleaving techniques across N and R ways can be combined to perform a N*R=3*2=6-way interleaving across 6 memory channels, Ch0-Ch5, using address bits A[9:7].

Additionally, some exemplary embodiments can also be directed to controlling a "degree of spreading." As used herein, the term "degree of spreading" refers to uniformity of memory traffic distribution across the memory channels. For example, a higher degree of spreading corresponds to greater uniformity in distribution of traffic across memory channels. In some aspects, the degree of spreading is seen to be related to a number of address bits selected across all generations G, except for the final one (i.e., for G=G_total) for mapping bit combinations of the selected bits to the memory channels across which interleaving is desired. In general, using a larger number of selected address bits can reduce non-uniformities in spreading across the memory channels. The number of selected address bits can be based on the overall number of address bits in the memory space (e.g., 32-bits, in the above-described embodiments) and the number of memory channels across which spreading is desired.

Figure 7A:
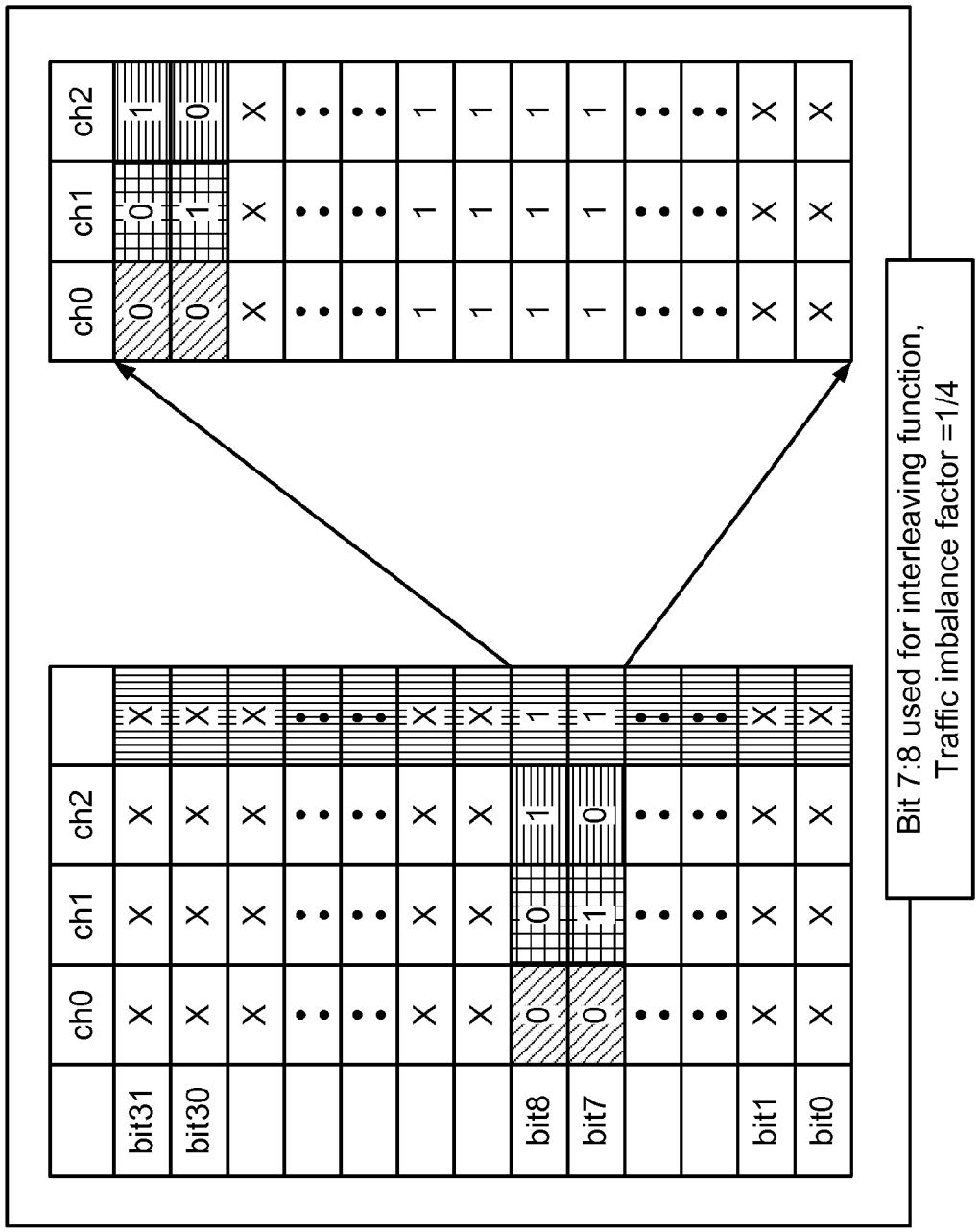
FIGS. 7A-B illustrates a traffic imbalance factor for selection of number of interleaving bits in exemplary embodiments.
Figure 7B:
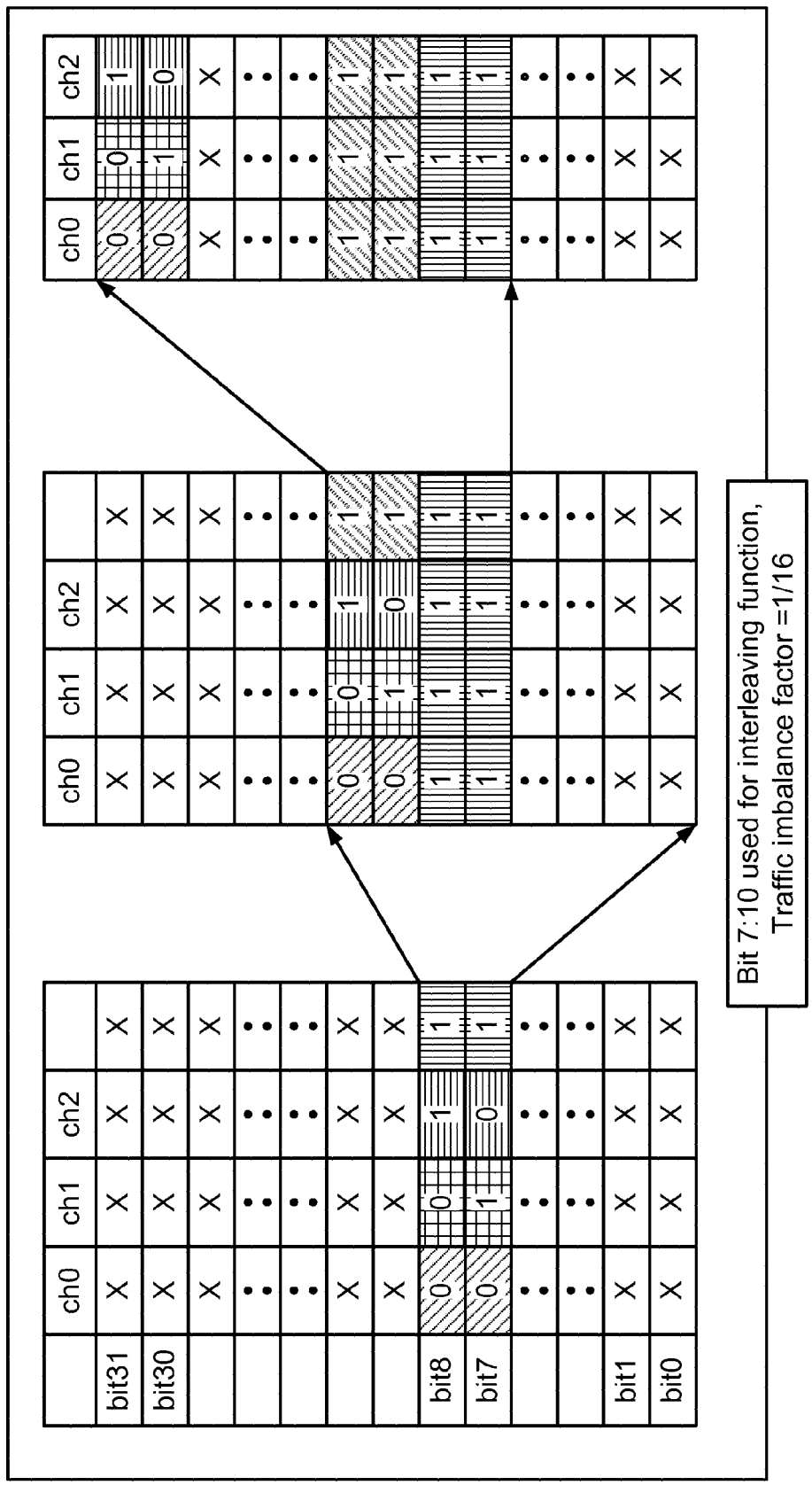

With reference to FIG. 7 (comprising FIGS. 7A-B), exemplary aspects pertaining to a degree of spreading in exemplary channel spreading functions is illustrated. In this context, a "traffic imbalance factor," pertains to a percentage of memory access transactions which will not be evenly distributed among the given number of memory channels. More specifically, the traffic imbalance factor can be reduced by increasing the number of address bits selected for interleaving, or the degree of interleaving. For example, the traffic imbalance factor is reduced by half if the number of bits in the subset of address bits used for interleaving (or degree of interleaving) in each round or generation is doubled. For N-way interleaving across N memory channels, where N is expressed as (L−K)/F, the degree of interleaving is "n" (i.e., "n" address bits are selected for interleaving across the N memory channels in each generation). As illustrated in FIG. 7A, where n=2 in the above-described example with reference to FIG. 3 for three-way memory interleaving, wherein address bits A[8:7] are selected in generation G=1, the traffic imbalance factor for linear access patterns is provided by the expression, $K/2^n = \frac{1}{2}^2 = \frac{1}{4}$. If the degree of interleaving is doubled, say, to 2n, as illustrated in FIG. 7B, i.e., four bits A[10:7] are selected in generation G=1, the traffic imbalance factor for linear access pattern is dramatically reduced, to $K/2^{(2n)} = \frac{1}{2}^4 = \frac{1}{16}$. Accordingly, the degree of interleaving, or the number of address bits to be selected for interleaving in each generation and the total number of generations G_total, can be determined by considering a desired traffic imbalance factor in related embodiments. In further detail, the number of address bits, for purposes of determining the traffic imbalance factor, in FIG. 7 for example, is the number of address bits selected in each generation G, except for the final generation pertaining to G=G_total.

Figure 8:
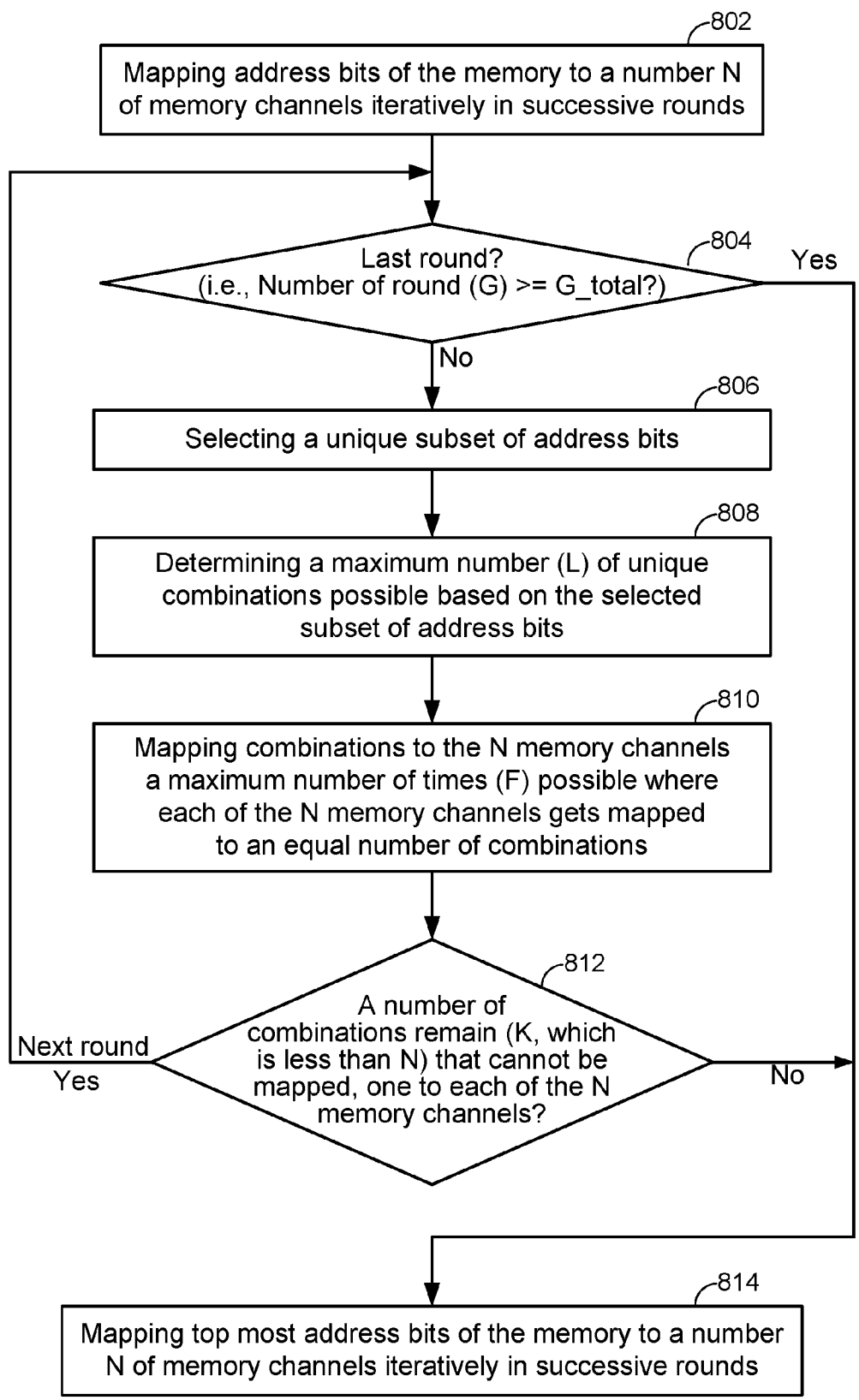
FIG. 8 is a flow chart pertaining to a memory of memory interleaving according to exemplary embodiments.

It will be appreciated that embodiments include various methods for performing the processes, functions and/or algorithms disclosed herein. For example, as illustrated in FIG. 8, an embodiment can include a method of memory interleaving. For convenience of illustration, some of the actions will be related to elements of FIGS. 2-5. However, the embodiments are not limited to the elements of FIGS. 2-5. The method starts at Block 802 for mapping address bits of the memory to a number N of memory channels iteratively in a predetermined number (G_total) of successive rounds. In each round, except the last round (i.e., G=G_total, as determined at Block 804): select a subset of address bits comprising a predefined number (n) of lowest order address bits that have not been used for interleaving across the N memory channels—Block 806; determine a maximum number (L) of unique binary values that can be represented by the selected subset of (n) address bits—Block 808; map an equal number of binary values within the maximum number to each of the N memory channels—Block 810; and if and when a number of binary values remain (K<N) that cannot be mapped an equal number (F) of times to each of the N memory channels, entering a next round—Block 812. The last round comprises mapping a subset of a last number of most significant address bits to each of the N memory channels (wherein the last number is obtained by the formula, or mathematical expression, ceiling($\log_2$ N)—Block 814. It will be appreciated that the illustrated flowchart is merely to facilitate a discussion of the various embodiments. However additional subject matter/functions disclosed herein may be reduced to various methods not explicitly illustrated, which are encompassed within the various embodiments disclosed herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for interleaving memory addresses over two or more memory channels. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of memory interleaving, the method comprising:
    mapping, by a memory controller, binary values represented by address bits of a memory to a number N of memory channels, iteratively in a predetermined number (G_total) of successive rounds, wherein each round, except the last round comprises:
        selecting a subset of address bits comprising a predefined number (n) of lowest order address bits that have not been used for interleaving across the N memory channels;
        determining a maximum number (L) of unique binary values that can be represented by the selected subset of (n) address bits;
        mapping an equal number of binary values within the maximum number to each of the N memory channels; and
        if and when a number of binary values (K) remain, wherein, K is less than N, and wherein the K number of binary values cannot be mapped an equal number of times to each of the N memory channels, entering a next round; and
    in the last round, mapping, by the memory controller, binary values represented by a last number (min_bits) of most significant address bits to the N memory channels.

2. The method of claim 1, wherein N, L, K, and F satisfy the equation, N=(L−K)/F, wherein F is a natural number and L-way spreading across L memory channels is applied F number of times during each one of the predetermined number of successive rounds.

3. The method of claim 1, further comprising, mapping binary values represented by a different subset of address bits to a second number R of memory channels, with a combined mapping of the memory into N*R ways iteratively in successive rounds.

4. The method of claim 1, wherein the subset of address bits in a subsequent round are adjacent to and more significant than address bits of the preceding round.

5. The method of claim 1, wherein a traffic imbalance factor is reduced if a number of bits in the subset of address bits is increased.

6. The method of claim 5, wherein the traffic imbalance factor is reduced by half if the number of bits in the subset of address bits is doubled.

7. The method of claim 1, wherein the predetermined number (G_total) is a programmable constant.

8. The method of claim 1, wherein the last number is determined by the mathematical expression, ceiling($\log_2$ N).

9. A processing system comprising:
    a memory comprising a number N of memory channels;
    means for mapping binary values represented by address bits of the memory to the N memory channels, iteratively in a predetermined number (G_total) of successive rounds, comprising, for each round, except the last round:
        means for selecting a subset of address bits comprising a predefined number (n) of lowest order address bits that have not been used for interleaving across the N memory channels;
        means for determining a maximum number (L) of unique binary values that can be represented by the selected subset of (n) address bits;

means for mapping an equal number of binary values within the maximum number to each of the N memory channels; and means for, if and when a number of binary values (K) remain, wherein, K is less than N, and wherein the K number of binary values cannot be mapped an equal number of times to each of the N memory channels, entering a next round; and means for, in the last round, mapping binary values represented by a last number (min_bits) of most significant address bits to the N memory channels.

10. The processing system of claim 9, wherein N, L, K, and F satisfy the equation, N=(L−K)/F, wherein F is a natural number and L-way spreading across L memory channels is applied F number of times during each one of the predetermined number of successive rounds.

11. The processing system of claim 9, further comprising means for mapping binary values represented by a different subset of address bits to a second number R of memory channels, with a combined mapping of the memory into N*R ways iteratively in successive rounds.

12. A processing system comprising:
a processor;
a memory communicatively coupled to the processor, the memory comprising a number N of memory channels;
a memory controller configured to map binary values represented by address bits of the memory to the N memory channels, iteratively in a predetermined number (G_total) of successive rounds, comprising, for each round, except the last round, the memory controller configured to:
select a subset of address bits comprising a predefined number (n) of lowest order address bits that have not been used for interleaving across the N memory channels;
determine a maximum number (L) of unique binary values that can be represented by the selected subset of (n) address bits;
map an equal number of binary values within the maximum number to each of the N memory channels; and
if and when a number of binary values (K) remain, wherein, K is less than N, and wherein the K number of binary values cannot be mapped an equal number of times to each of the N memory channels, enter a next round; and
in the last round, map binary values represented by a last number (min_bits) of most significant address bits to the N memory channels.

13. The processing system of claim 12, wherein N, L, K, and F satisfy the equation, N=(L−K)/F, wherein F is a natural number and L-way spreading across L memory channels is applied F number of times during each one of the predetermined number of successive rounds.

14. The processing system of claim 12, wherein the memory controller is further configured to map binary values represented by a different subset of address bits to a second number R of memory channels, with a combined mapping of the memory into N*R ways iteratively in successive rounds.

15. The processing system of claim 12, wherein the subset of address bits in a subsequent round are adjacent to and more significant than address bits of the preceding round.

16. The processing system of claim 12, wherein a traffic imbalance factor is reduced if a number of bits in the subset of address bits is increased.

17. The processing system of claim 16, wherein the traffic imbalance factor is reduced by half if the number of bits in the subset of address bits is doubled.

18. The processing system of claim 12, wherein the predetermined number (G_total) is a programmable constant.

19. The processing system of claim 18, wherein the predetermined number (G_total) is programmable via a register coupled to the processor.

20. The processing system of claim 12, wherein the memory controller is further configured to determine the last number based on the mathematical expression, ceiling($\log_2$ N).

21. A non-transitory computer-readable storage medium comprising code, which, when executed by a processor, causes the processor to perform operations for interleaving a memory coupled to the processor, the memory comprising N memory channels, the non-transitory computer-readable storage medium comprising:
code for mapping binary values represented by address bits of the memory to the N memory channels, iteratively in a predetermined number (G_total) of successive rounds, comprising, for each round, except the last round:
code for selecting a subset of address bits comprising a predefined number (n) of lowest order address bits that have not been used for interleaving across the N memory channels;
code for determining a maximum number (L) of unique binary values that can be represented by the selected subset of (n) address bits;
code for mapping an equal number of binary values within the maximum number to each of the N memory channels; and
code for, if and when a number of binary values (K) remain, wherein, K is less than N, and wherein the K number of binary values cannot be mapped an equal number of times to each of the N memory channels, entering a next round; and
code for, in the last round, mapping binary values represented by a last number (min_bits) of most significant address bits to the N memory channels.

22. The non-transitory computer-readable storage medium of claim 21, wherein N, L, K, and F satisfy the equation, N=(L−K)/F, wherein F is a natural number and L-way spreading across L memory channels is applied F number of times during each one of the predetermined number of successive rounds.

23. The non-transitory computer-readable storage medium of claim 21, further comprising code for, mapping binary values represented by a different subset of address bits to a second number R of memory channels, with a combined mapping of the memory into N*R ways iteratively in successive rounds.

* * * * *